(12) United States Patent
Weiste

(10) Patent No.: US 6,443,671 B1
(45) Date of Patent: Sep. 3, 2002

(54) PNEUMATIC DISTRIBUTION MACHINE WITH A FLAT TUBE BEND

(76) Inventor: Helmut Weiste, Siegmund-Schultze-Weg 12, Soest, D-59494 (DE)

( * ) Notice: Subject to any disclaimer, the term of this patent is extended or adjusted under 35 U.S.C. 154(b) by 0 days.

(21) Appl. No.: 09/622,114

(22) PCT Filed: Mar. 25, 1999

(86) PCT No.: PCT/DE99/00948
§ 371 (c)(1),
(2), (4) Date: Aug. 11, 2000

(87) PCT Pub. No.: WO99/49719
PCT Pub. Date: Oct. 7, 1999

(30) Foreign Application Priority Data

Mar. 30, 1998 (DE) .......................... 198 14 030

(51) Int. Cl.⁷ .............................. B65G 51/18
(52) U.S. Cl. ....................... 406/195; 406/92
(58) Field of Search ................... 406/92, 195

(56) References Cited

U.S. PATENT DOCUMENTS

| 3,606,097 | A | | 9/1971 | Wall | |
|---|---|---|---|---|---|
| 4,010,551 | A | * | 3/1977 | Rohde | 34/57 R |
| 4,685,843 | A | * | 8/1987 | Kelm | 406/181 |
| 4,717,289 | A | | 1/1988 | Popowich et al. | |
| 5,033,398 | A | | 7/1991 | Froc | |
| 5,288,111 | A | * | 2/1994 | Storf et al. | 285/179 |
| 5,908,032 | A | * | 6/1999 | Poindexter et al. | 131/291 |
| 6,227,770 | B1 | * | 5/2001 | Poncelet et al. | 406/195 |

FOREIGN PATENT DOCUMENTS

| DE | 22 56 939 | 2/1977 |
|---|---|---|
| EP | 0 277 288 | 8/1988 |
| JP | 08 214758 | 8/1996 |

\* cited by examiner

*Primary Examiner*—Christopher P. Ellis
*Assistant Examiner*—Joe Dillon, Jr.
(74) *Attorney, Agent, or Firm*—Merchant & Gould P.C.

(57) ABSTRACT

The invention is a pneumatic delivery line of a type used for distributing seeds or fertilizer. The pneumatic delivery line is guided to the distributor in an essentially vertical manner. The delivery line includes a flat tube bend at some point along its length. The delivery line may have an unevenly constructed inner wall.

9 Claims, 5 Drawing Sheets

PNEUMATIC DISTRIBUTION MACHINE WITH A FLAT TUBE BEND

CROSS-REFERENCE TO RELATED APPLICATIONS not applicable

STATEMENT REGARDING FEDERALLY SPONSORED RESEARCH OR DEVELOPMENT not applicable

REFERENCE TO A "MICROFICHE APPENDIX"

not applicable

FIELD OF THE INVENTION

The invention concerns a pneumatically operating distribution machine.

BACKGROUND OF THE INVENTION

Pneumatically operating distribution machines have long been known and serve, among other things, to spread seeds or fertilizer. These distribution machines known from practice display a storage container for the goods to be distributed, and, following this, a metering of the goods to be distributed takes place by means of a metering element, and subsequent to this there takes place, via a pneumatic delivery line, a pneumatic delivery of the goods to be distributed to a distributor, from which, in turn, lines lead to the individual spreading elements.

Especially in the case of larger distribution machines, the pneumatic delivery line at first runs in an essentially horizontal direction, and afterward there results a change in direction of the delivery line towards the distributor arranged further above, so that before reaching the distributor the delivery line is essentially vertically oriented.

At this point of change in direction of the delivery line from an initial level running to a vertical rising towards the distributor, there occurs a concentration of the seed grains in the conveying air stream at the outside wall of the bend, due to the twisting, usually present, of the current in the delivery line and due to the centrifugal forces. Through this concentration, a completely uniform distribution of the seeds in the distributor and subsequently in the lines coming from the distributor to the spreading elements is impeded.

Corrugated tubes or other fittings in the vertically-designed conveying tube underneath the distributor head are not capable of again dispersing the unbalanced seed stream in the relatively short stretch between the bend of the delivery line and the distributor head.

Solutions have been developed, e.g. corresponding to DE-PS 22 56 939, to again disperse, through baffle plates built into the bend, the grain stream before the entrance into the vertical delivery line. These bends equipped with baffle plates are, however, disadvantageous, since the radius of curvature of the bend must be relatively large in order to keep the flow losses small, and through the baffle or deflecting plates the total resistance of the bend is considerably increased; furthermore, with different seeds there is the possibility of damage to the grains. Baffle or deflecting plates are also disadvantageous due to the fact that when they are arranged in the center of the air current, they do not ensure an optimal distribution, since a concentration of the goods to be distributed occurs on the outer side of the curve, so that the central baffle plate catches only about a third of the grain stream.

SUMMARY OF THE INVENTION

The object of the invention is to create a pneumatic distribution machine of the generic type that makes possible an improved distribution of the seeds inside the vertical delivery tube to the distributor, without using baffle or deflecting plates, which have the above-mentioned disadvantages.

This object of the invention is achieved through the use of an essentially vertical dispersing tube defining a turning point therein. The dispensing tube has an unevenly formed inner wall. The dispensing tube also has a flat tube bend at its turning point.

In other words, it is proposed that in the region of the change of direction of the pneumatic delivery line, i.e. from a level-running region into a region rising to the distributor, the pneumatic delivery line be provided with a cross section differing from the shape of the delivery means attached to the exit of this region.

Advantageous configurations of the invention include, but are not limited to, the following.

The cross section of the flat tube bend may be rectangular, or may be oval.

The delivery line may have an asymmetrical junction of the flat tube bend with the dispersing tube. In such cases, the outer-curve wall of the flat tube bend may be parallel with a central axis of the flat tube bend.

At least a part of the inner surface of the flat tube bend may be unevenly formed.

The cross section of the delivery line leading to the flat tube bend may be circular. Likewise, the cross section of the delivery line leading from the flat tube bend may be circular.

The dispersing tube may be a corrugated tube.

BRIEF DESCRIPTION OF THE SEVERAL VIEWS OF THE DRAWINGS

Examples of embodiment of the invention are reproduced in the drawings that follow. They show.

DETAILED DESCRIPTION OF THE INVENTION

Figure 1:
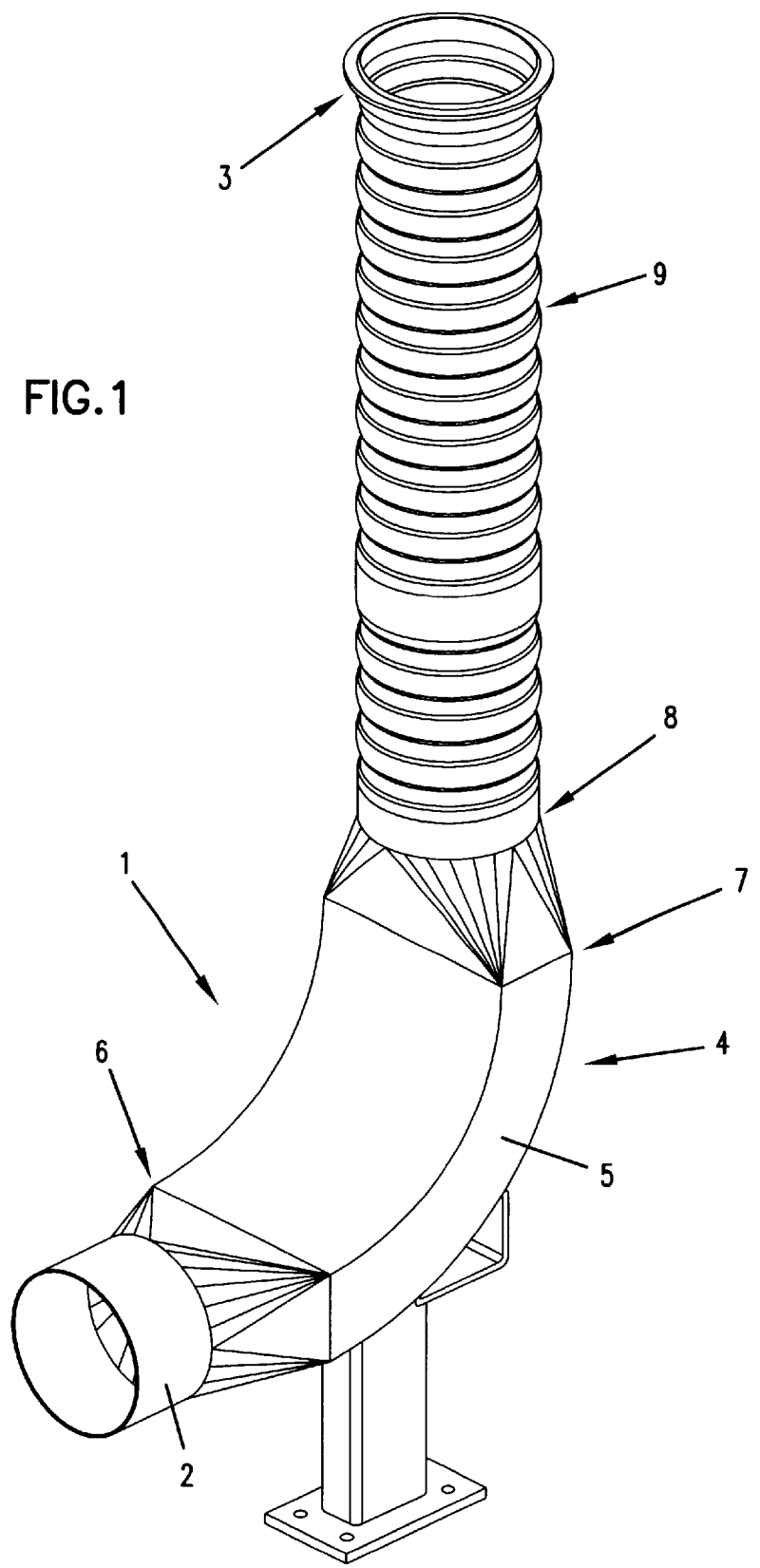
FIG. 1: a view of a point of directional change of the pneumatic delivery line
Figure 2:
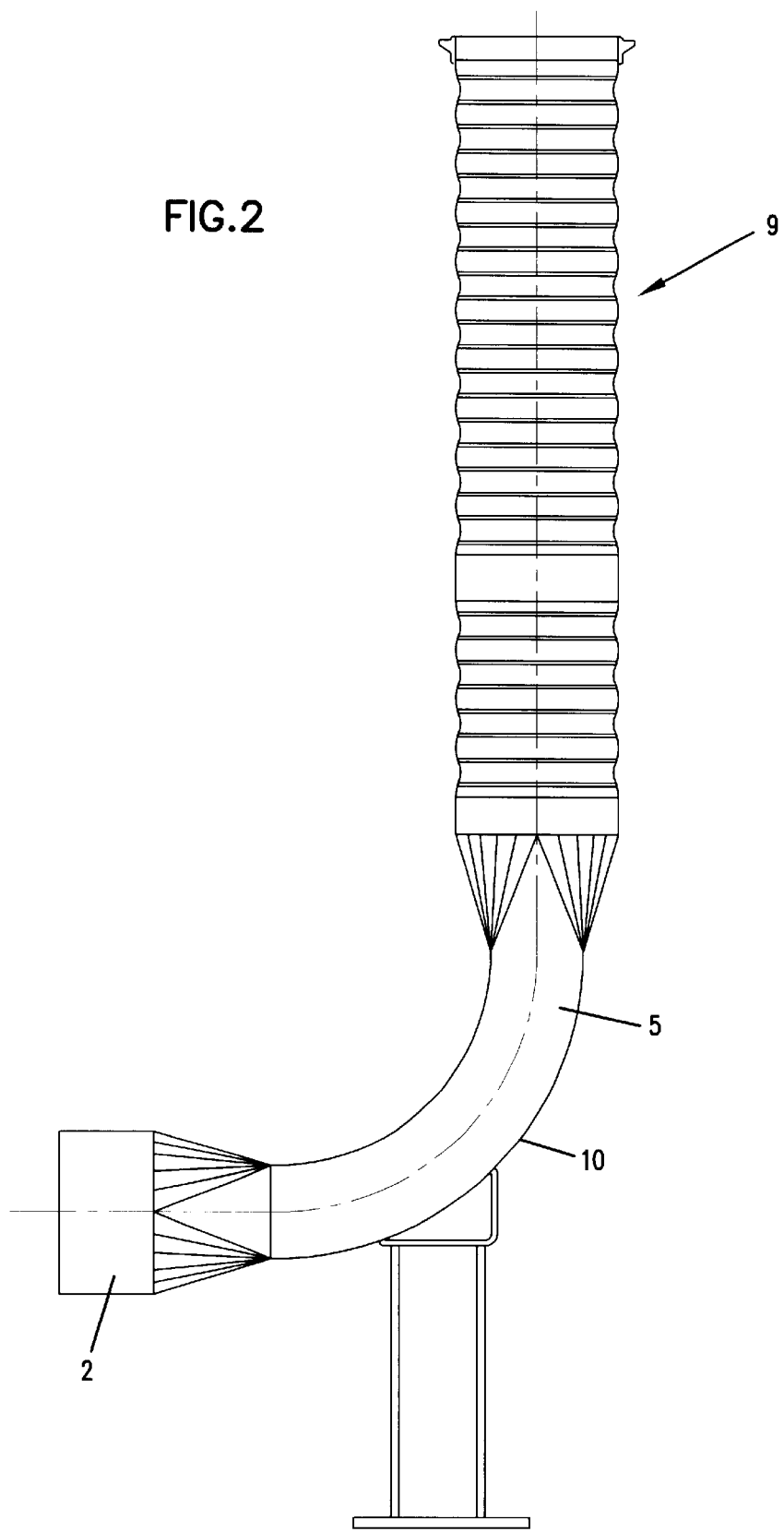
FIG. 2: the region of the delivery line represented in FIG. 1, in a lateral view
Figure 3:
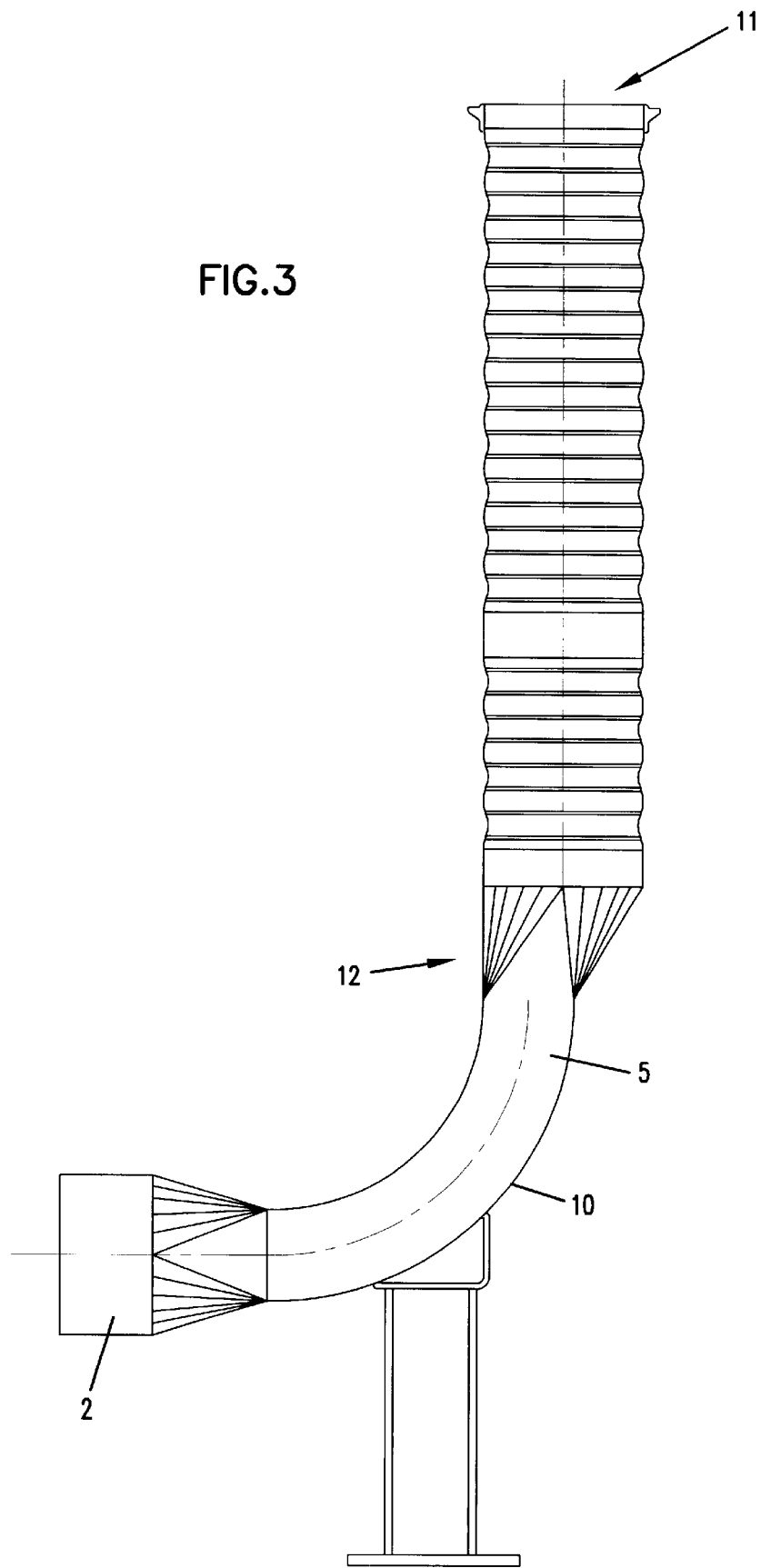
FIG. 3: a further example of embodiment of the invention in a lateral view
Figure 4:
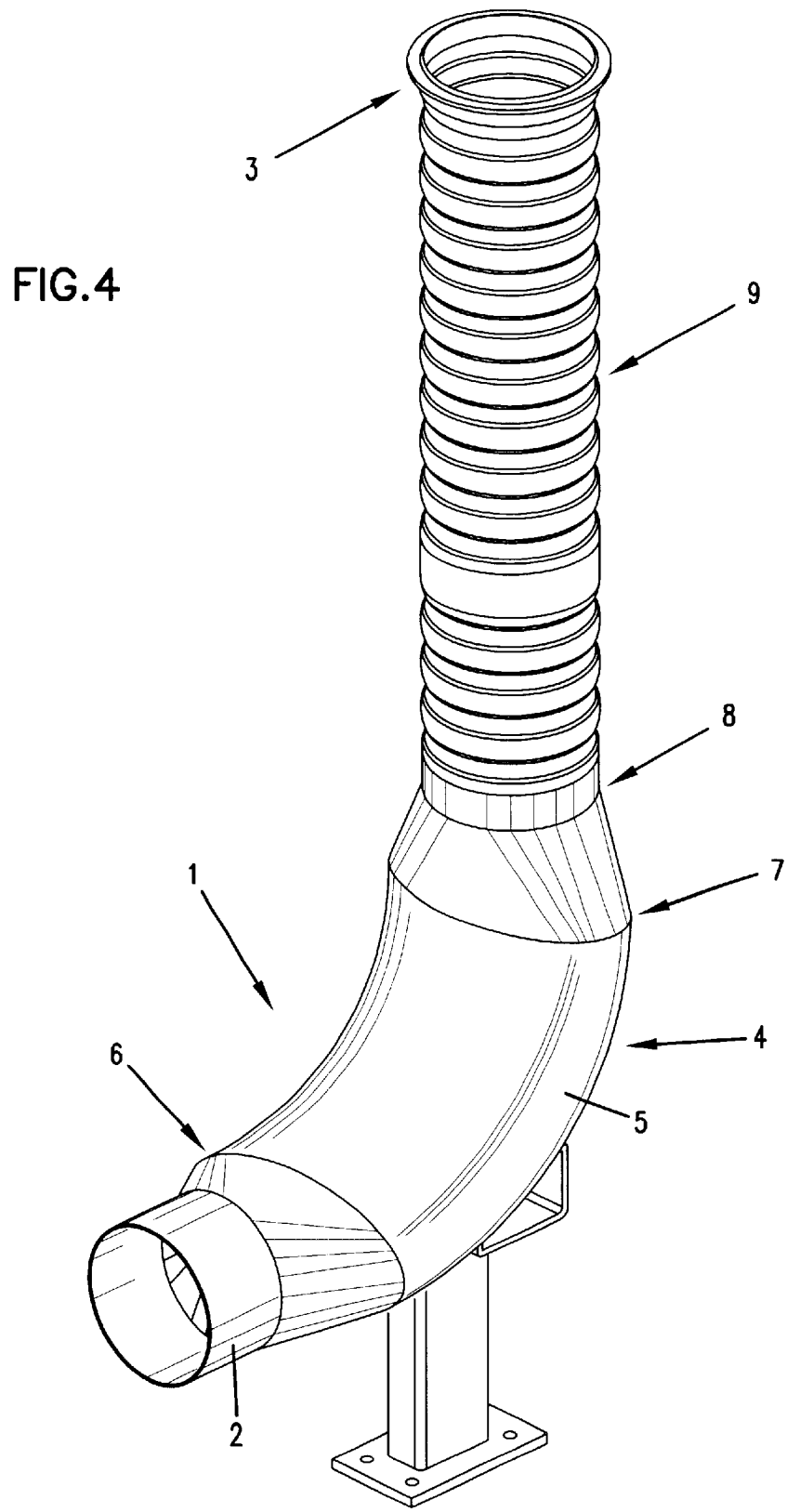
FIG. 4: a view of an embodiment having a flat bend with an oval cross section
Figure 5:
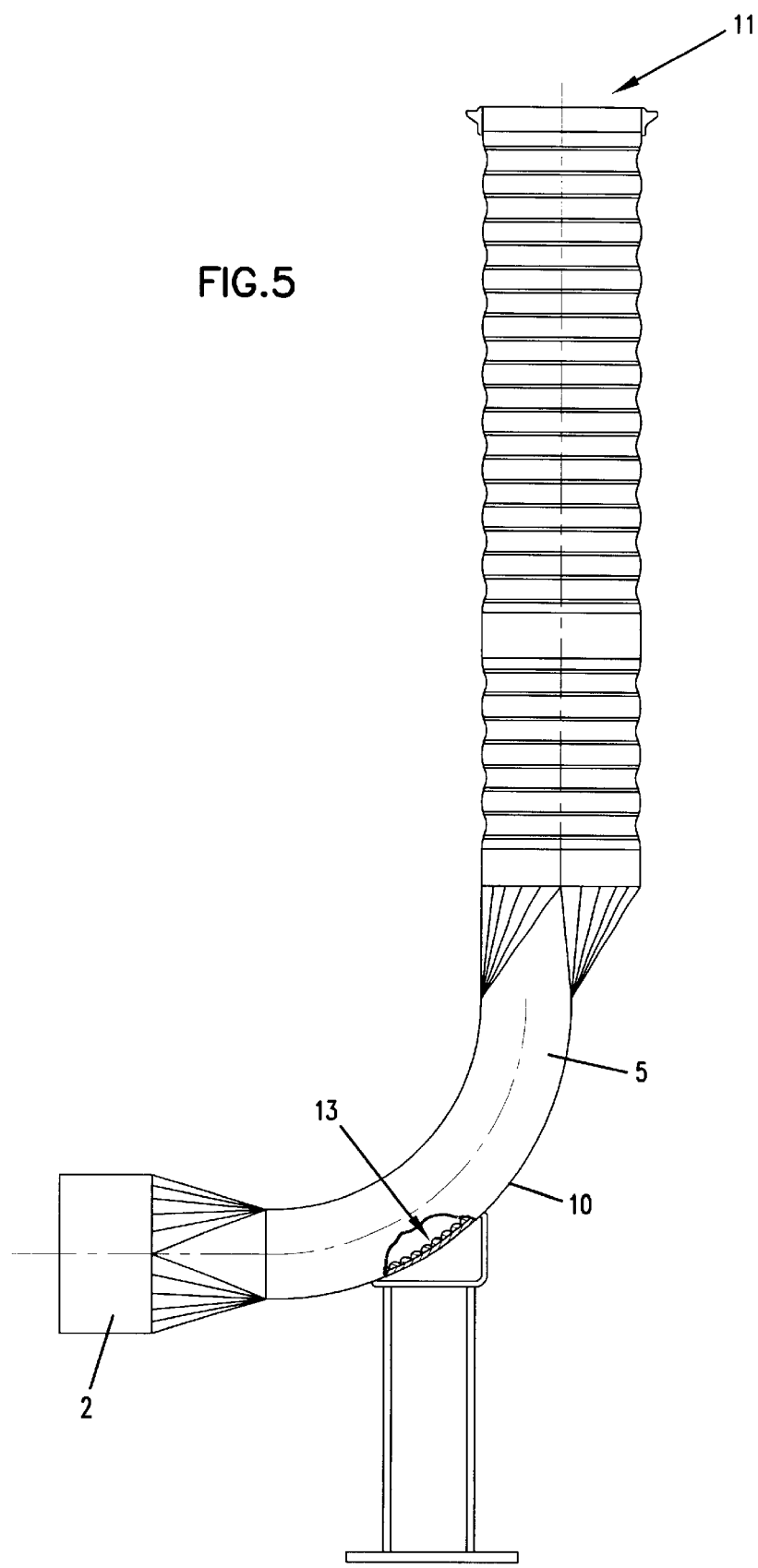
FIG. 5: a view of the embodiment of FIG. 3, with a cutaway showing an unevenly formed inner wall of the flat tube bend

Referring to FIG. 1, a pneumatic delivery line 1 is shown in partial representation. Here, by means of a connection collar 2, a delivery line (not shown) can be connected to the metering element and to the storage container. At the outlet-side end 3, a delivery line leading to the distributor head (not shown) can be attached, or, as the case may be, the distributor can be directly attached to the outlet-side end, which distributor can in turn display outlet lines to the particular spreading elements, e.g. for the fertilizer or for the seed.

The represented region 1 of the pneumatic delivery line displays a bend 4 in which the direction of the pneumatic delivery line 1 changes, i.e. from a section that, in this example of embodiment, is essentially horizontal into a section that is vertical, before it reaches the distributor head. This bend 4 is formed as a flat tube bend 5 that, in this example of embodiment, displays a rectangular cross section but, for example, could also be designed with an oval cross section.

The delivery tube, formed at first with a circular cross section, attaches to the connection collar 2 and a continuous change in the cross section takes place, until finally at 6 the cross section typical of the flat tube bend 5 is attained. After this, starting at 7 a continuous change in the cross section of the flat tube bend 5 occurs, until at last at 8 the circular cross section is again attained. The pneumatic delivery tube 1 is formed between the flat tube bend 5 and the distributor as a dispersing tube 9, which in this example of embodiment is a corrugated tube. However, it is also possible to design the dispersing tube 9 in different ways, so that its inner walls are formed in an uneven manner, e.g. through burls on the inner walls, in order to thereby maintain an optimal distribution of the goods up to the distributor. An uneven inner surface of the flat tube bend is shown in cutaway in FIG. 5, and is indicated by reference number 13.

In the example of embodiment corresponding to FIGS. 1 and 2, the flat tube bend 5 attaches in a centered manner to the dispersing tube 9. However, it is also possible to enable the flat tube bend 5 to attach to the dispersion tube 9 in an asymmetrical manner, as can be seen in FIG. 3. In this example of embodiment an outer-wall curve 10 of the flat tube bend 5 is arranged so that it meets on a level with a center axis 11 of the dispersing tube 9. The asymmetrical junction is indicated by reference number 12.

One advantage of the described flat bend tube 5 is the fact that no additional baffle plates are required, which plates impede the flow; rather, only by means of the outside wall of the flat tube bend 5 itself is the delivery stream directed and conducted centrally into the entrance region of the dispersing tube 9. This effect is enhanced still further when one does not arrange the flat cross section symmetrically with respect to the circular cross section of the dispersing tube, corresponding to FIGS. 1 and 2, but rather arranges it in an offset manner, as shown in FIG. 3.

By virtue of the fact that at point 7 there takes place a transition of the non-round, flat bend into a circular cross section of the dispersing tube 9, aimed portions of the grain stream are steered from the sides of the flat tube bend onto the corrugated walls of the vertical dispersing tube 9 in a crossing manner. Through this, in a practically ideal manner a dispersion and uniform distribution of the grain stream is achieved without baffling plates.

In the flat cross section of the flat tube bend 5 a possibly present twisting of the stream is eliminated and its propagation in the vertical dispersing tube is prevented.

A further advantage of a bend 4 that is essentially flat in cross section is the fact that the radius of curvature can be smaller with the same flow resistance. This makes possible a lower total structural height of the bend from the horizontal position of the pneumatic delivery tube up to the distributor head.

The dispersing tube 9 can be optionally designed as shown; however, it can also be formed with burls on its inner walls, in order to obtain an uneven surface.

What is claimed is:

1. Pneumatically operating distribution machine for distributing especially seeds or fertilizer, with a storage container for the goods to be distributed, a metering element that is connected thereto, and a distributor, which is connected to the metering element via a pneumatic delivery line, wherein from a turning point onwards the pneumatic delivery line describes a change of direction and leads to the distributor in an essentially vertical manner, characterized through the delivery line (1), which at the turning point (4) is formed as a flat tube bend (5), and through the unevenly-formed inner wall of the delivery line (1) formed between the flat tube bend (5) and the distributor as a dispersing tube (9).

2. Distribution machine according to claim 1, characterized through a rectangular cross section of the flat tube bend (5).

3. Distribution machine according to claim 1, characterized through an oval cross section of the flat tube bend (5).

4. Distribution machine according to claim 1, characterized through the cross section of the delivery line leading to the flat tube bend and the delivery line leading from the flat tube bend (5), which cross section is circular.

5. Distribution machine according to claim 1, characterized through the forming of the dispersion tube (9) as a corrugated tube.

6. Distribution machine according to claim 1, characterized through the asymmetrical junction of the flat tube bend (5) with the dispersing tube (9).

7. Distribution machine according to claim 6, characterized through the leading in of the outer-curve wall (10) of the flat tube bend (5) on a level with a central axis (11) of the dispersing tube (9).

8. Distribution machine according to claim 1, characterized through the at least partially unevenly-formed inner walls of the flat tube bend (5).

9. Distribution machine according to claim 8, characterized through the surface of the inner wall of the outside-curve wall (10) of the flat tube bend (5), which surface is unevenly formed.

* * * * *